Figure 6:
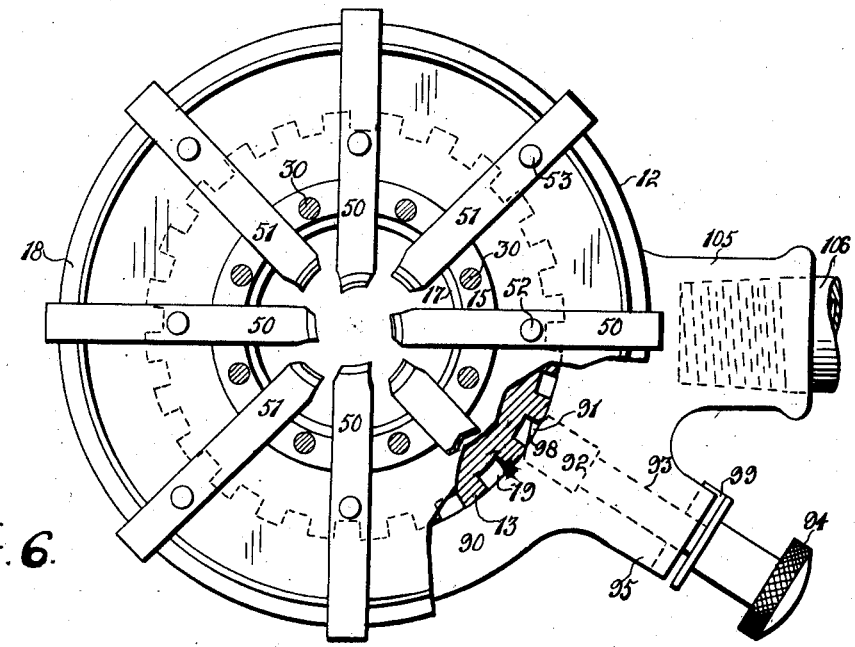

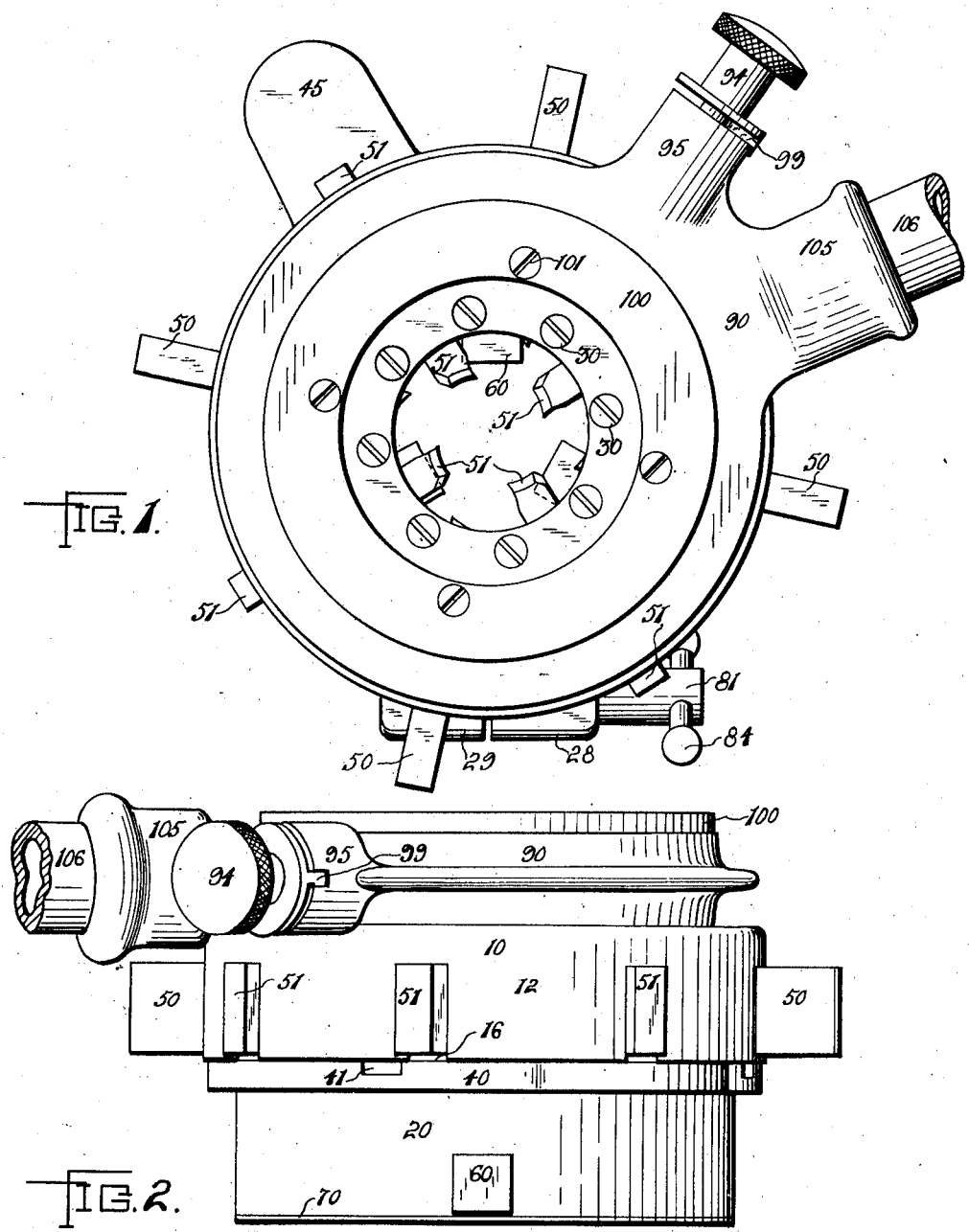

I. W. NONNEMAN.
DIESTOCK.
APPLICATION FILED MAY 3, 1918.
1,339,473.
Patented May 11, 1920.
4 SHEETS—SHEET 2.
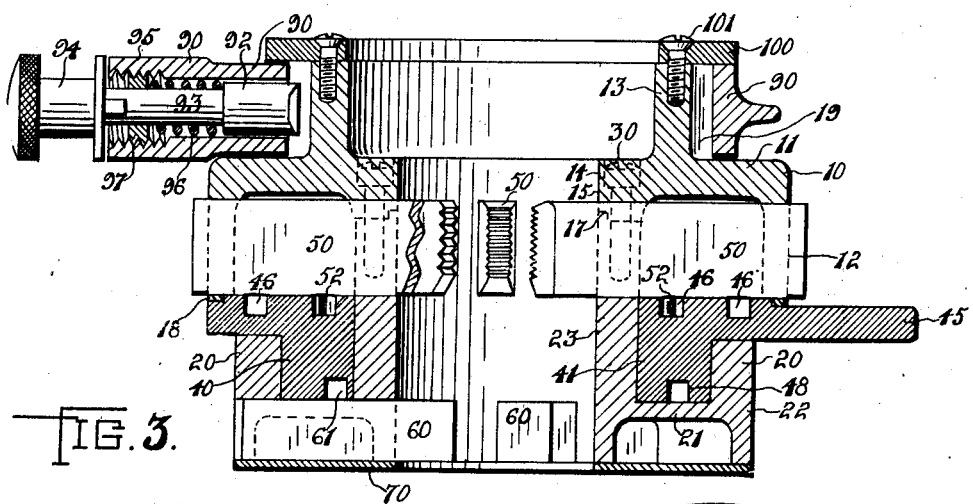
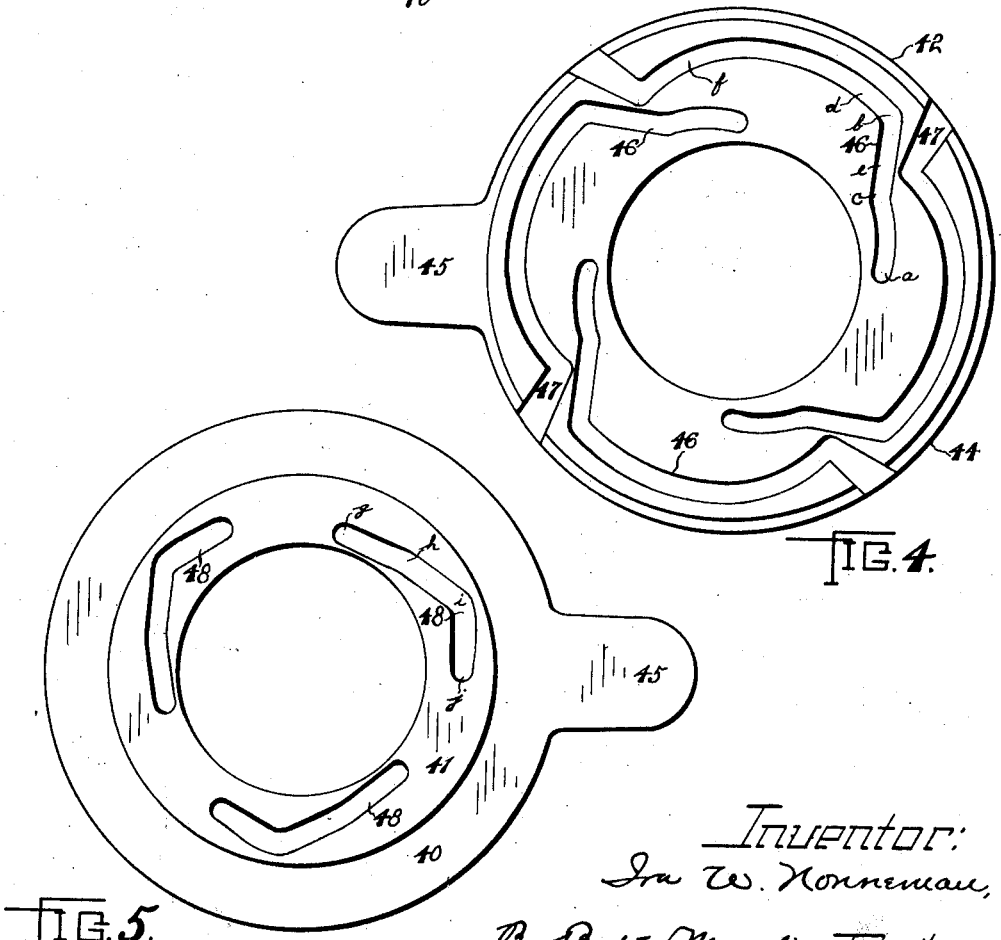
Inventor:
Ira W. Nonneman,
By Bate Macklin, Atty's.

Inventor:
Ira W. Nonneman,
By Baker Macklin, Att'ys

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIESTOCK.

1,339,473.  Specification of Letters Patent.  Patented May 11, 1920.

Application filed May 3, 1918. Serial No. 232,197.

*To all whom it may concern:*

Be it known that I, IRA W. NONNEMAN, a citizen of the United States, residing at Warren, in the county of Trumbull and State of Ohio, have invented a certain new and useful Improvement in Diestocks, of which the following is a full, clear, and exact description, reference being had to the accompanying drawings.

One of the objects of this invention is to provide a simple and efficient die stock adapted to be very readily adjusted for cutting threads on pipes of different diameter and for properly guiding such pipes. To this end, I have provided chasers and adjustable guiding blocks and a single operating device for concurrently moving the chasers and guide blocks in and out.

Another object of the invention is to enable the die stock to cut threads of different pitch on pipes of different diameter and in accomplishing this, I provide a plurality of sets of chasers, each set having its cutting teeth of a different pitch, and I combine such plurality of sets with the same operating device which adjusts the pipe guides. This enables the setting of the die stock for a considerable range of pipes with a maximum ease and rapidity.

Associated with the settable chasers and dies is a locking device adapted to clamp all the set parts in desired position.

My invention very readily adapts itself for embodiment in a die stock adapted to cut threads of two different pitches each on two sizes of pipe, though the invention is not limited to this particular embodiment. When so embodied the die stock may be very useful in cutting threads, for example, on one-quarter inch and three-eighths inch pipes the standard for which is eighteen threads to the inch, and on one-half inch and three-fourths inch pipes which require fourteen threads. It is very convenient to have the die stock able to thread all different sizes of pipe within a certain range, and my die stock is well adapted to accomplish this result.

My invention may be conveniently summarized as consisting of the combination of coöperating elements illustrated in the drawings hereof and hereinafter more fully explained and set out in the claims.

Figure 7:
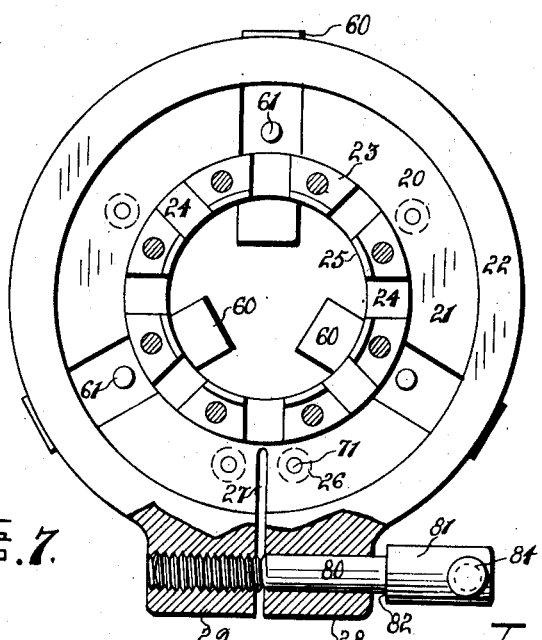
Figure 8:
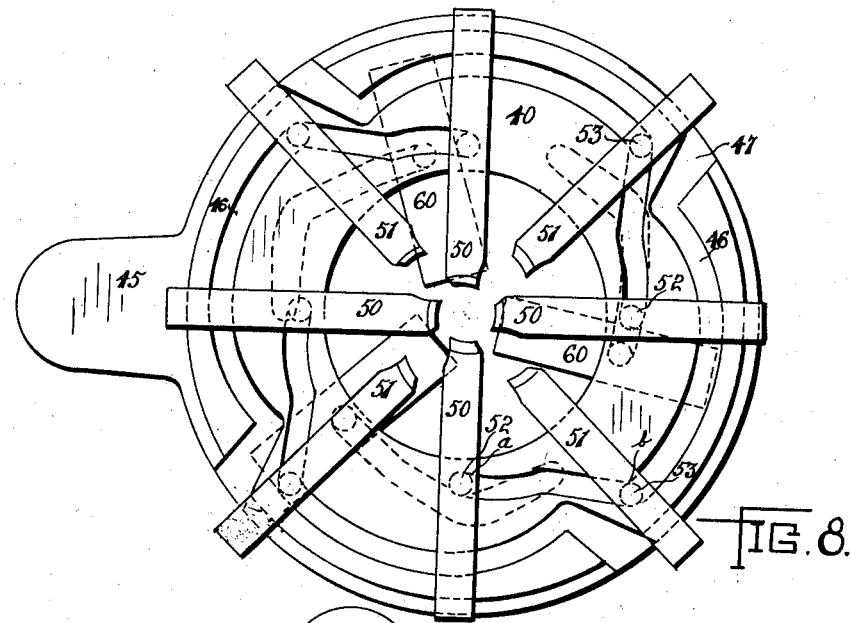
Figure 9:
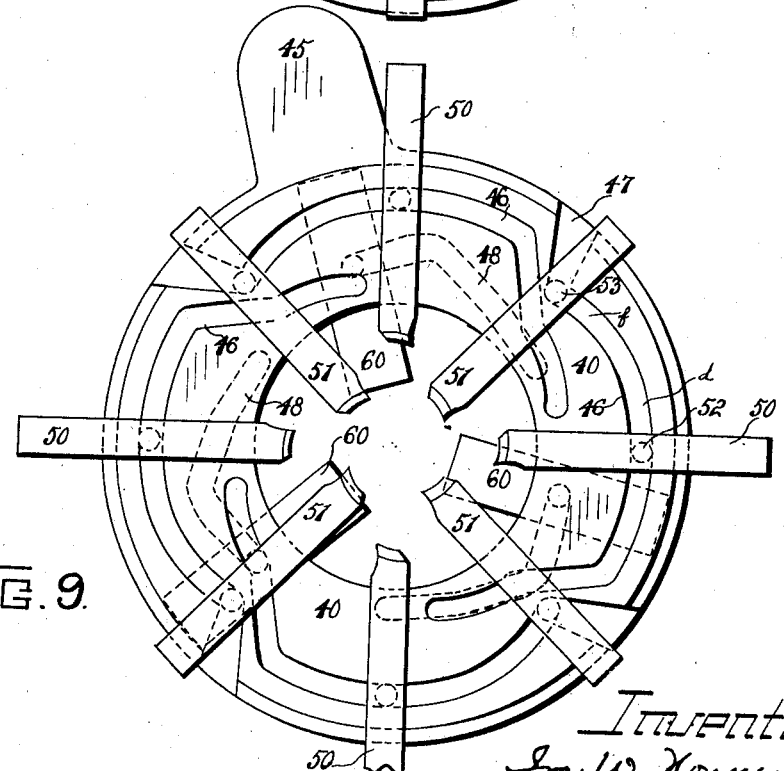

In the drawings, Figure 1 is a plan of a ratchet die stock embodying my invention; Fig. 2 is a side elevation of the same; Fig. 3 is an axial section through the die stock; Fig. 4 is a plan of the cam plate which operates the chasers and guides; Fig. 5 is a bottom plan of this plate; Fig. 6 is a transverse section of the die stock above the cam plate and looking upwardly, being on the plane of separation of the upper and lower members of the frame; Fig. 7 is a transverse section of the die stock illustrating the portion of the die stock carrying the pipe guides, this view being substantially a cross section on the same plane as Fig. 6, but looking downwardly and with the cam plate removed; Fig. 8 is a diagrammatic plan of the cam plate, chasers and pipe guides set for threading the smallest size of pipe, where the chasers with the finer thread are active; Fig. 9 is a similar view set for a larger size of pipe, where the chasers with the coarser thread are active.

The frame of my die stock consists primarily of two annular members 10 and 20 secured together end to end, as by the screws 30. The chasers (50, 51) and the pipe guides 60 occupy radial notches in this frame as hereinafter explained, and between the chasers and guides is a single annular member 40 having cam grooves for operating the chasers and guides.

The member 10 has a flat annular portion 11 from the outer edge of which depends a wall 12. At the center of the member 10 is a circular opening 14. Adjacent to this opening the member has a downwardly projecting annular boss 15. The member 20 has a transverse web portion 21, an outer cylindrical wall 22 and an inner cylindrical wall 23. The outer wall is preferably less in diameter than the wall 12 of the upper casing, while the inner wall 23 has a bore alining with the bore 14 of the other member. The sleeve 23 of the lower member abuts the upper member and the parts are effectively secured together by screws 30.

The wall 23 of the lower member rises considerably higher than the wall 20 and has radial notches 24 through it which register with radial notches 16 in the wall 12, these registering notches being for the purpose of guiding the chasers hereinafter described. To position one of these frame members centrally on the other, I form a slight annular rib on one, occupying a recess on the other; as shown there is a rib 25 on the wall 23 which engages a rabbet 17 in the lower edge of the boss 15.

The chasers in the die stock shown consist of sets, each with a plurality of members, each set representing a different thread. It is most satisfactory to have four chasers in a set. The die stock shown illustrates two sets of chasers of four each. Thus we may have one set of chasers 50 carrying eighteen threads to the inch and suitable for quarter inch and three-eighths inch pipes and another set 51 carrying fourteen threads to the inch and suitable for cutting one-half and three-fourths inch pipes. The threading of these chasers is exaggerated in Fig. 3 for clearness of illustration.

The pipe guides consist of radial blocks 60 mounted in radial guideways carried by the lower frame member 20. The notches for the walls of these blocks are made through the inner wall 23 and the outer wall 22 and also through the transverse wall 21. As shown in Fig. 3 the inner and outer wall are reduced in thickness at their lower portion for lightness. The lower end of the die stock is closed by a plate 70 secured to the member 20 by screws 71, Fig. 7, which screw into round bosses 26 projecting downwardly from the transverse web 21.

The cam plate 40, which is housed between the two members of the frame and operates all of the chasers and the pipe guides, is clearly shown in Figs. 3, 4 and 5. It consists of an annular plate-like member which rotatably surrounds the wall 23 and has a downwardly projecting collar 41 occupying the annular chamber of the member 20 between the walls 22 and 23. The plate portion 40 rests on the top of the wall 20. Its outer periphery 42 substantially alines with the periphery of the wall 12 of the upper member, and the plate has an annular rabbet 44 just inside its periphery which is occupied by an annular rib 18 at the extreme lower edge of the wall 12. The member 40 has a projecting handle 45 by which it may be readily turned about the axis of the die stock.

The turning of the cam plate feeds the chasers in or out and correspondingly adjusts the pipe guides, so that only one movement is necessary to adjust the die stock for different sizes of pipe. This will be apparent from the following more detailed description of the cam grooves shown.

The cam plate is provided with four grooves 46 in its upper face which are adapted to be occupied by pins 52 and 53 projecting downwardly from the chasers 50 and 51 respectively. Each of the four grooves 46 is adapted to receive the pins of two adjacent chasers; that is, one chaser 50 for the fine threads and an adjacent chaser 51 for the coarser threads have their pins seating in the same groove 46. As appears from Fig. 8 when the pins 52 are adjacent to the innermost ends $a$ of the grooves, these chasers are set for cutting the smallest size pipe, for instance, a quarter inch pipe, this being the position shown in Fig. 8. At the same time the chasers 51 have their pins 52 adjacent to the outermost angle $b$ of the groove, these chasers being idle. Now, if the cam plate be turned slightly on its axis, the chasers 50 are cammed outwardly by reason of the eccentric portion of the groove, and when their pins 52 are reached by the angle $c$ (Fig. 4) of the groove, these chasers become set for the next larger size, for instance, three-eighths inch. During this movement the coarser chasers 51 remain idle, as the corresponding portion $d$ of the groove is concentric.

Further movement of the cam plate from the position just described causes the rapidly diverging portion $e$ (Fig. 4) of the groove 46 to act on the pin 52 and force this chaser radially outward to idle position, while the chasers 51 are still held by the concentric portion $d$ of the groove. This concentric portion is so positioned with reference to the pins 53 on the chasers 51 that it holds them in position for cutting their largest size of pipe, as for example, three-fourths inch, and accordingly the die stock is set for that size as soon as the chasers 50 have been cammed to their outermost position. Now, if the rotation of the cam plate be continued farther, the pins 53 are engaged by the inwardly eccentric portion $f$ of the cam groove which forces these chasers inward to a position where they are adapted to a smaller size of pipe, as for example, one-half inch. This is the position shown in Fig. 9.

It will be seen from the above description that the continued movement of the cam plate may successively set first the chasers with the fine threads for their sizes of pipe and then the chasers with the coarse threads with their sizes. Any suitable coöperating marking on the cam plate and frame may insure proper position of the cam plate for the different sizes.

For operating the pipe guides, I place cam grooves 48 (Fig. 5) in the lower face of the hub 41, which grooves are occupied by pins 61 extending upwardly from the guide blocks 60. These grooves are so placed that when the pins 52 of the chasers 50 are at the inner end $a$ of the groove 46 the pins 61 of the guide block 60 are at the inner end $g$ of the grooves 48. In the particular embodiment shown this position corresponds to a quarter inch pipe. Now, when the cam plate has been turned to bring the portion $c$ of the groove 46 into engagement with the chaser pins 52 the portion $h$ of the groove 48 is acting on the guide pins 61, and the chasers 50 and guide blocks 60 are held in position for three-eighths inch pipe.

On further movement of the cam plate, while the chaser pins 52 are traveling outwardly to the outer angle $b$ of the groove 46, the guide pins 61 travel outwardly to the outer angle $i$ of the groove 48, and this is the position where the fine thread chasers are idle and the chasers 51 are set for a three-fourths inch pipe. Finally, a further movement of the cam plate carries the guide pins 53 to position $f$ of the groove 46 and brings the chasers 51 into a position for one-half inch pipe, and at the same time the inwardly extending portion of the groove 48 brings the guide pins 61 to position $j$, which holds the blocks in position for one-half inch pipes.

It will be seen from the above that the movement of the cam plate in one direction sets both the fine chasers and the guide blocks for two sizes of pipe, and then sets the coarser chasers and the guide blocks for two larger sizes. I find it enables the tool to be more compact to place the largest size, requiring the outermost position of the cam grooves in an intermediate position, that is between the largest of the finer thread sizes and the smallest of the larger thread sizes. In the specific embodiment described this makes the adjustment as follows: one-fourth inch, three-eighths inch, three-fourths inch, one-half inch. If the die stock were made to take larger sizes of pipe it might be desirable to have more than two positions for each pitch of thread; so also it might be feasible to have more than two sets of chasers. The present embodiment is to be taken as an illustration of any plurality of sets of chasers, each set being adapted to have any plurality of positions.

To enable the chasers to be readily removed and new ones supplied, I provide outward extensions 47 on each cam groove 46. These extensions lead to the extreme edge of the plate, and if the plate be turned so that they substantially register with the notches 16 in the wall 12 the chaser may be inserted from the outside with its pin entering the groove portion 47, and with a slight turning of the cam plate, coming into registration with the groove 46. In the arrangement of chasers as above explained the fine threaded chasers 50 are first inserted and then the cam plate is turned sufficiently to bring the grooves 47 into registration with the next set of radial notches and the chasers 51 inserted.

While the notches 47 on the cam plate furnish means for removing the chasers, it is desirable that means be provided to prevent the chasers inadvertently dropping out. To effect this without employing extra parts, I make the guide block slots 48 only long enough to provide for the operative movement of the chasers. Accordingly the ends $j$ of these slots form abutments limiting the movement of the cam plate and preventing it turning far enough to bring the extensions 47 of the grooves 46 into registration with the notches 16. When it is desired to remove the chasers, the bottom plate 70 is taken off and the guide blocks removed, and this frees the cam plate from this stop and allows it to be swung far enough to remove the chasers.

As the cam plate holds both sets of chasers and also the guide blocks, it will be evident that the chasers and guide blocks may be locked in fixed position by locking the cam plate to the frame. I find a very simple and satisfactory way to do this is to form a radial kerf 27 in the lower frame member 20, whereby this frame member may be slightly sprung, and then to draw it together to clamp the hub 41 of the cam member in the annular groove of the frame member. This clamping may be very readily effected by a screw 80 passing loosely through an ear 28 on the member 20 and screwing into a corresponding ear 29 on this member, a shoulder 82 on the head 81 of the screw being adapted to abut the outer edge of the ear 28 and thus constrict the frame member about the boss of the cam plate. A suitable handle, as for example, a headed pin 84 passing loosely through the screw head 81 provides convenient means for tightening and loosening this screw.

Any suitable means may be employed for rotating the die stock about the axis of the pipe to effect the threading operation. I find it very convenient to employ the ratchet mechanism shown in the drawings. As shown in Figs. 1 to 3 and 6 there is an upwardly extending sleeve 13 rising from the annular plate-like portion 11 of the upper frame member 10. This sleeve 13 has formed on its outer periphery vertical notches 19, preferably having radial edges. Journaled about the periphery of the sleeve 13 is an annular ring 90 which carries a ratchet faced plunger 92 adapted to engage in the notches 19.

The plunger 92 has its head seating in a radial cavity in the ring. Leading outwardly from the head is a shank 93 and at the outer end of the shank is a knob 94. The shank occupies a hollow boss 95 formed on the ring. Within this boss and surrounding the shank is a compression spring 96 bearing at its inner end against the head 92 and held at its outer end by an annular plug 97 screw-threaded into the boss 95. The spring tends to force the plunger inwardly to cause the abrupt shoulder on its face to engage one of the radial faces of a notch 19. The ring may turn freely in one direction by reason of the gradual face 98 (Fig. 6) on the end of the plunger camming over the teeth on the sleeve, while when placed in the opposite position the abrupt face of the plunger end causes the die stock frame to be turned with the ring 90.

To change the direction of feed, it is simply necessary to draw out the plunger and turn it half way around. This is accomplished by the knob 94. The plunger is held with its head facing in either direction by reason of a lug 99 on the hub of the knob engaging either of a pair of diametrically opposed notches in the end of the boss 95.

The ratchet ring is held on the die stock by a suitable overhanging ring 100 secured to the sleeve 13 by screws 101. A suitable handle socket 105 is formed on the ring 90 and adapted to be occupied by a handle 106, whereby the ring may be readily operated back and forth to give a ratchet feed to the die stock to turn it either onto the pipe or off of the pipe, according to how the plunger is set.

It will be seen from the above description that my die stock is very simple in construction, firm when assembled and still readily separable when necessary. The chasers may be easily taken out and replaced whenever it is desired to substitute others for them, while there is no danger of their inadvertent dropping out. In use, simply positioning the cam plate and locking it by the clamping screw sets the die stock for either thread, and either size of pipe corresponding thereto, as desired.

Having thus described my invention, what I claim is:

1. In a die stock, the combination, with a frame, of two sets of chasers, the individuals of one set being interspersed with those of the other, a single set of guide blocks common to both sets of chasers, and a common positioning device for the guide blocks and chasers, said positioning device comprising a rotative plate located between the chasers and guide blocks and having on one side a set of cam shoulders each of which engages two adjacent chasers and on the other side a set of cam shoulders each of which engages a guide block.

2. In a die stock, the combination, with a frame, of a plurality of sets of chasers slidably mounted therein, a set of guide blocks slidably mounted therein, a rotative cam plate mounted in the frame intermediate of the chasers and guide blocks, said cam plate having on one side cam shoulders each of which engages two adjacent chasers and on the other side cam shoulders each of which engages a guide block and is adapted to move said block both outwardly and inwardly for one direction of movement of the cam plate.

3. In a die stock, the combination with a frame, of a plurality of sets of chasers mounted therein, the different sets having cutting teeth of different fineness, a rotative cam plate mounted in the frame and having cam grooves operating all of the sets of chasers, guide blocks mounted in the frame and having a cam engagement with the cam plate formed correlatively with the cam engagement of the chasers and adapted to move the guide blocks both outwardly and inwardly for one direction of rotation of the cam plate, whereby the cam plate may position either set of chasers and correspondingly position the guide blocks.

4. In a die stock, the combination of a frame comprising two annular members, each member having an outer wall and at least one of the members having an inner wall, the members abutting and being secured together at the inner wall, a rotative cam plate having a collar portion journaled between the walls of one frame member, chasers guided by the frame engaging one side of the cam plate, and guide blocks guided by the frame engaging the collar on the other side of the cam plate.

5. In a die stock, the combination of a frame comprising two annular members secured together, each member having an outer wall and at least one of them an inner wall, the outer walls having clearance between them, a rotative cam plate having a collar portion journaled between the walls of one frame member, and extending across the outer wall of that member and engaging the outer wall of the other member, an outwardly extending operating handle for the cam plate, chasers guided by the frame engaging one side of the cam plate, and guide blocks guided by the frame engaging the collar on the other side of the cam plate.

6. In a die stock, the combination of an annular frame member having concentric walls, the inner wall rising higher than the outer wall, a cooperating annular frame member abutting and secured to the end of the inner wall and having an outer wall projecting toward the other frame member but leaving an annular clearance space between them, a rotative plate surrounding the inner wall of the first mentioned member and substantially engaging the top of the outer wall, and chasers and guide blocks having a cam engagement with the upper and under faces of said cam plate.

7. In a die stock, the combination of a so-called lower frame member having concentric annular walls, the inner wall rising higher than the outer wall, a coöperating annular so-called upper frame member abutting and secured to the end of the inner wall and having an outer wall projecting toward the other frame member but leaving an annular clearance space between them, a rotative plate surrounding the inner wall of the first mentioned member and having an annular boss occupying the space between the inner and outer wall of said member and extending over the top of the outer wall, there being radial notches through the outer wall of the so-called upper member and the inner wall of the so-called lower member, radial chasers slidably occupying said notches, a cam engagement between said chasers and said cam plate, radial notches in the outer and inner wall of the so-called lower member, guide blocks occupying the last named notches, a cam engagement between said guide blocks and the collar on the cam member.

8. In a die stock, the combination of a frame, chasers carried thereby, a rotative plate having a cam engagement with said chasers, said plate having an annular collar occupying a correspondingly shaped recess in the frame, said frame being split adjacent to the collar, and means for drawing the split portions of the frame toward each other to clamp the collar and lock the cam plate and chasers.

9. In a die stock, the combination of a frame, chasers mounted therein, guide blocks mounted therein, a cam plate mounted between the chasers and guide blocks, a cam engagement between said plate and the chasers, said plate having a rigid annular collar occupying the frame and projecting toward the guide blocks, there being a cam engagement between said collar and the guide blocks, the frame adjacent to said collar being split, and means for drawing the split portions of the frame together to clamp the collar.

10. In a die stock, the combination of a frame, chasers mounted therein, guide blocks mounted therein, a cam plate mounted between the chasers and guide blocks, a cam engagement between said plate and the chasers, said plate having a rigid annular collar occupying the frame and projecting toward the guide blocks, there being a cam engagement between said collar and the guide blocks, the frame adjacent to said collar being split, a pair of ears carried by the frame on opposite sides of the split, and a screw passing through one of said ears and threaded in the other for drawing said ears together to clamp the cam plate.

11. In a die stock, the combination of a frame comprising two annular members secured together end to end, a rotative cam plate mounted between said members about the inner wall of one of them, chasers mounted in radial notches in the frame and having a cam engagement with the cam plate, an annular extension from one of said frame members having a notched outer periphery, a ring surrounding said notched periphery, and a plunger mounted in said ring and adapted to engage the notches.

12. In a die stock, the combination of a so-called lower member having an inner annular wall and a concentric outer annular wall rising to a less height than the inner wall, a cam plate surrounding said inner wall and extending onto the top of said outer wall and having an annular collar between said walls, guide blocks journaled in said member having a cam engagement with the under face of said collar, a so-called upper frame member in annular form secured to the top of said inner wall and having an outwardly extending portion with a cylindrical skirt on its outer edge which substantially engages the top of the cam plate, chasers occupying alined notches in said skirt and in the inner wall of the lower member and having a cam engagement with the upper face of the cam plate, an annular portion rising from said upper member and having notches in its outer periphery, a ring surrounding such portion, and a movable ratchet-faced plunger occupying said ring and adapted to engage said notches.

In testimony whereof, I hereunto affix my signature.

IRA W. NONNEMAN.